US005437917A

United States Patent [19]

Ohe et al.

[11] Patent Number: 5,437,917

[45] Date of Patent: Aug. 1, 1995

[54] IMAGE-RECEIVING PAPER

[75] Inventors: Tomio Ohe; Shigeru Katayama; Kenichiro Itoh, all of Osaka, Japan

[73] Assignee: Nitto Denko Corporation, Osaka, Japan

[21] Appl. No.: 221,573

[22] Filed: Apr. 1, 1994

[30] Foreign Application Priority Data

Apr. 1, 1993 [JP] Japan .................................. 5-100214

[51] Int. Cl.$^{6}$ .................................................. B32B 3/00

[52] U.S. Cl. .................................... 428/211; 428/195; 428/199; 428/200; 428/212; 428/337; 428/411.1

[58] Field of Search ............ 428/199, 337, 211, 537.5; 427/288; 346/135.1; 162/106

[56] References Cited

U.S. PATENT DOCUMENTS

| | | | |
|---|---|---|---|
| 3,876,463 | 4/1975 | Cree | 117/218 |
| 3,933,489 | 1/1976 | Walters | 96/1.4 |
| 4,132,834 | 1/1979 | Damico | 428/511 |
| 4,454,199 | 6/1984 | Berbeco | 428/322.2 |
| 5,085,936 | 2/1992 | Herdman | 428/337 |

*Primary Examiner*—Patrick J. Ryan
*Assistant Examiner*—William A. Krynski
*Attorney, Agent, or Firm*—Sughrue, Mion, Zinn, Macpeak & Seas

[57] ABSTRACT

An image-receiving paper comprising a label paper and a separate paper which is releasably adhered to the label paper, wherein the label paper has a surface resistivity of from $1\times10^{6}$ to $1\times10^{13}$ $\Omega/cm^{2}$, and comprises a synthetic resin film having formed on the front surface thereof a matted layer and also having formed on the back surface thereof an adhesive layer, the separate paper comprises a synthetic resin film having formed on the front surface thereof a releasing layer and also having formed on the back surface thereof a matted layer and an antistatic agent layer, and the coefficients of thermal shrinkage of the label paper and/or the separate paper in the lengthwise direction and the width direction are all 1% or less in a specific test method.

4 Claims, 1 Drawing Sheet

IMAGE-RECEIVING PAPER

FIELD OF THE INVENTION

The present invention relates to an image-receiving paper used for a printing apparatus using an electrostatic transfer method with a toner.

The image-receiving paper of the present invention is excellent in heat resistance and can be printed by a high-speed printing apparatus and a low-speed printing apparatus.

BACKGROUND OF THE INVENTION

A printing method by an electrostatic transfer with a toner includes an electrophotographic system such as an analog copying machine or a digital printer. Recording papers used for these printing apparatus generally include papers including recording papers for an over head projector (OHP), tuck sheets, etc. Label sheets are mainly used as label papers such as papers for bar code, etc., posters, etc.

A general layer structure of the label sheet is designed to form a resin layer on a film at a label side in order to increase the adhesion to a toner and also to obtain a more stable running property of a sheet by increasing the electrical conductivity of the surface to reduce electrostatic charging by static electricity.

Coated papers are mainly used as base films of these label papers and separate papers. In bar code label paper for managing an article, etc., when the article is changed, it is necessary to change the bar code. In this case, in the step of stripping off the sheet, there is a possibility to break the bar code itself and hence such a conventional bar code label paper is not practical. Further, in a high humidity district, a coated paper is largely deformed with moisture and hence in such a case a synthetic paper is preferably used as the base film. As the base material for such a synthetic paper, a polypropylene resin is mainly used alone or as a laminated layer thereof. The synthetic paper has a less possibility to be broken by the re-peeling thereof but severe curling occurs by the heat (140° to 150° C.) of a fixing roll in the case of using the synthesis paper.

However, recently, the printing speed is more and more increased and a higher fixing temperature is required, whereby the use of a thermally stable heat-resistant film has been investigated. In the label paper using such a heat-resistant base film, deformation and curling do not occur at an ordinary fixing roll temperature (130° to 150° C.) but in the case of using a fixing roll at higher temperature (e.g., 200° C.), the heat shrinking extent differs between the label side and the separate side of the label paper to cause severe curling and deformation.

To overcome the problem, it is proposed to use a same synthetic resin film as the films at the label side and at the separate side (see, JP-UA-63-24299; the term "JP-U-A" used herein means an "unexamined published Japanese utility model application"). However, even when such a method is used, by using a synthetic resin film which is unstable in a stretching extent of the synthetic resin film and is thermally unstable, curling occurs. Further, if a synthetic resin film wherein the thermal deformation differs between both the surfaces thereof is used, large curling occurs.

SUMMARY OF THE INVENTION

An object of the present invention is to provide an image-receiving paper which does not cause deformation and curling even when it is used for a high-speed printing apparatus using a fixing roll at high temperature (about 200° C.) and which is suitable for a label sheet by an electrostatic transfer with a toner.

As a result of the various investigations on the above-described theme, the inventors have found that by restraining the coefficient of shrinkage of a base film by heat to a specific range, an image-receiving paper capable of stably running even in the case of a fixing roll at high temperature, and have accomplished the present invention based on this finding.

According to one embodiment of the present invention, there is provided an image-receiving paper comprising a label paper and a separate paper which is releasably adhered to the label paper, wherein the label paper has a surface resistivity of from $1\times10^6$ to $1\times10^{13}$ $\Omega/cm^2$ and comprises a synthetic resin film having formed on the front surface thereof a matted layer and also having formed on the back surface thereof an adhesive layer, the separate paper comprises a synthetic resin film having formed on the front surface thereof a releasing layer and also having formed on the back surface thereof a matted layer and an antistatic agent layer, and the coefficients of thermal shrinkage $\epsilon$ of the label paper in the lengthwise direction and the width direction are all 1% or less in a definite test method.

According to another embodiment of the present invention, there is provided an image-receiving paper comprising a label paper and a separate paper which is releasably adhered to the label paper, wherein the label paper has a surface resistivity of from $1\times10^6$ to $1\times10^{13}$ $\Omega/cm^2$, and comprises a synthetic resin film having formed on the front surface thereof a matted layer and also having formed on the back surface thereof an adhesive layer, the separate paper comprises a synthetic resin film having formed on the front surface thereof a releasing layer and also having formed on the back surface thereof a matted layer and an antistatic agent layer, and the coefficients of thermal shrinkage $\epsilon$ of the separate paper in the lengthwise direction and the width direction are all 1% or less in a definite test method.

DETAILED DESCRIPTION OF THE INVENTION

The present invention is described in detail below.

Figure 1:
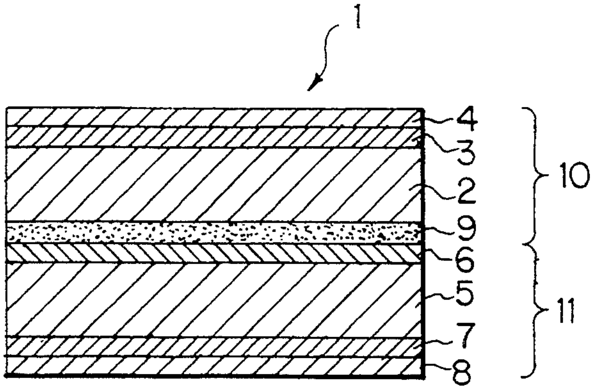
FIG. 1 is an enlarged cross sectional view showing the construction of one example of the image-receiving paper of the present invention.

FIG. 1 is an enlarged cross sectional view showing one example of the image-receiving paper of the present invention. In FIG. 1, the image-receiving paper 1 comprises a label paper 10 and a separate paper 11. The label paper 10 comprises a base film 2 as a substrate having formed on the front surface thereof a matted layer 3 and optionally having formed on the matted layer an antistatic agent layer 4. The label paper 10 alone has, formed on the back surface of the base film 2, an adhesive layer 9 which is adhered to the separate paper 11. On the other hand, the separate paper 11 comprises a base film 5 as a substrate having formed on the front surface thereof a releasing layer 6. The separate paper 11 also has, formed on the back surface of the base film 5, a matted layer 7 and further an antistatic agent layer 8 formed on the matted layer 7.

Each layer of the image-receiving paper of the present invention is described in detail below.

(i) Label Paper

A synthetic resin film which can be used as the base film of the label paper is a film having a heat resistant temperature of at least 100° C., such as a polyester film, a polyimide film, a polycarbonate film, a cellulose ester film, a polyamide film, etc. By using such a base film, stable images can be obtained without a severe deformation by heat from a fixing roll and a heat welding to a fixing roll.

The thickness of the base film is preferably from 20 to 150 $\mu m$. It is preferred that the base film contains calcium carbonate, a titanium oxide powder, silica, etc., in an amount of from 5 to 50% by weight based on the weight of the base film resin to improve the whiteness thereof. Further, the synthetic resin film as the base film itself may contain voids.

Toners which are usually used for printing the label paper are toners comprising an epoxy resin, a polystyrene resin, a methacrylic acid resin, a polyester resin, polypropylene, polyethylene, polyvinyl chloride, etc. Carbon black, etc., are usually compounded with the resin.

A matted layer comprising a toner adhering resin having a good adhesive property with these toners as a binder is formed on the base film.

The matted layer generally comprises a powder and the binder. The powder which is preferably used for the matted layer is a silica powder, a calcium carbonate powder, etc., having a particle size of from 0.1 to 10 $\mu m$. The powder is preferably compounded with the binder in an amount of from 0.1 to 30% by weight based on the weight of the binder.

The binder for the matted layer is a conventional resin which is soluble in an organic solvent such as alcohol series solvents, ketone series solvents, chlorinated hydrocarbon solvents, etc., alone or as a mixed solvent thereof. Examples of the resins are a polyolefin resin, a polyester resin, an acrylic resin, etc.

The thickness of the resin layer (matted layer) is preferably from 0.1 to 5 $\mu m$. The surface resistivity of the matted layer is controlled to from $1\times10^6$ to $1\times10^{13}$ $\Omega/cm^2$ for static prevention by, if necessary, compounding an antistatic agent with the binder or coating the antistatic agent on the matted layer. If the surface resistivity of the matted layer is less than $1\times10^6$ $\Omega/cm^2$, the adhering property of toners is lowered, while if the surface resistivity is larger than $1\times10^{13}$ $\Omega/cm^2$, the transporting property of the image-receiving paper in a printing apparatus is reduced by charging of static electricity.

The adhesive layer is formed on the back surface of the base film of the label paper. It is preferred in the adhesive layer that the adhesive does not ooze by the pressure applied by fixing rolls. The adhesive force of the adhesive layer is preferably such that the label paper is easily released from the separate paper when releasing the label paper but the label paper and the separate paper are not separated from each other during transporting the assembly (i.e., the image-receiving paper).

The label paper has a surface resistivity of from $10^6$ to $10^{13}$ $\Omega/cm^2$.

Further, the label paper has coefficients of thermal shrinkage $\epsilon$ in the both the lengthwise direction and the width direction of 1% or less in the following test method:

Sample Form: 20 mm×100 mm
Load: None
Pre-treatment: 25° C. vacuum drying
($10^{-3}$ Torr or less), 24 hours
Heat Treatment Temperature: 150° C.±3° C.
Treatment Time: 30 minutes
Coefficient of Thermal Shrinkage $\epsilon$:

$$\epsilon=[(L_1-L_2)]/L_1]\times100$$

wherein $L_1$: Initial length
$L_2$: Length when allowed to stand at room temperature for 30 minutes after the heat treatment.

In this case, it is preferred that the separate paper also has coefficients of thermal shrinkage $\epsilon$ in both the lengthwise direction and the width direction of 1% or less in the above-described test method.

(ii) Separate Paper

The separate paper is adhered to the back surface side of the label paper. A synthetic resin film is used as the base film for the separate paper as same as in the label paper described above.

The base film which can be used is a film having a heat resistant temperature of at least 100° C., such as a polyester film, a polyimide film, a polycarbonate film, a cellulose ester film, a polyamide film, etc.

The thickness of the base film is preferably from 20 to 150 $\mu m$. The base film may contain silica, calcium carbonate, a titanium oxide powder, etc., to improve the whiteness as same as in the label paper. Further, a synthetic resin film containing voids may be used as the base film.

The separate paper has coefficients of thermal shrinkage $\epsilon$ in both of the lengthwise direction and the width direction of 1% or less in the above-described test method.

In this case, it is preferred that the label paper also has coefficients of thermal shrinkage $\epsilon$ in both the lengthwise direction and the width direction of 1% or less in the above-described test method.

The synthetic resin films which are the base films used for the label paper and the separate paper, respectively, described above each is heat-treated at a temperature of from 80° to 400° C. for at least 1 second (preheat treatment) to prevent occurrence of the thermal shrinkage to perform a thermal shrinkage of at least 0.1% in one of the lengthwise direction and the width direction. The synthetic resin film thus pre-treated is further heat-treated at 150° C. for 30 minutes, whereby the coefficients of thermal shrinkage of the synthetic resin in the lengthwise direction and the width direction all become 1% or less. In addition, before the heat treatment of the synthetic resin film at 150° C. for 30 minutes, if the coefficient of thermal shrinkage of the synthetic resin film in the lengthwise direction and the width direction by the heat treatment at 150° C. for 30 minutes are all 1% or less, the pre-heat treatment is not necessary.

For facilitating the separation of the separate paper and the label paper, the base film of the separate paper is subjected to a releasing treatment such as a silicone treatment, etc. For applying the releasing treatment, it is general to coat a silicone resin and in this case, an amount of the silicone resin coated is preferably from 0.05 to 1 μm in dry thickness.

A matting treatment may be applied to the back surface of the separate paper to prevent blocking or ensure the stable running property of the image-receiving paper. A silica powder or a calcium carbonate powder each having a particle size of from 0.1 to 10 μm is used as the matting agent. The matting agent may be incorporated in the binder in an amount of from 0.1 to 30% by weight based on the weight of the binder.

It is preferred to control the electrical conductivity of the back surface of the separate paper for facilitating the running property of the image-receiving paper as same as in the label paper side.

The surface resistivity of the back surface of the separate paper is from $1\times10^{6}$ Ω/cm$^2$ to $1\times10^{13}$ Ω/cm$^2$. If the surface resistivity is larger than $1\times10^{13}$ Ω/cm$^2$, the transporting property of the image-receiving paper in a printing apparatus is reduced by charging with static electricity.

When the coefficients of thermal shrinkage of the label paper and the separate paper in the lengthwise direction and the width direction by the thermal treatment at 150° C. for 30 minutes are all 1% or less, the anticurling property of the image-receiving paper is very high, but even if the coefficient of thermal shrinkage of either of the label paper and the separate paper is in the above-described range, an excellent anticurling property of the image-receiving paper is obtained.

Practically, in the image-receiving papers of the present invention, when printing is carried out using the image-receiving paper wherein the coefficients of thermal shrinkage of the base paper for the label paper in the lengthwise direction and the width direction by the heat-treatment at 150° C. for 30 minutes are all 1% or less and the base film for the separate paper has a coefficient of thermal shrinkage of at least 1%, the image-receiving paper can be sufficiently used in the case that temperature is not applied to an extent such that it gives heat deformation to a separate paper. However, in a printing apparatus using fixing rolls of the mechanism that the temperature of the fixing rolls is high and a fixing time is long, the heat of the fixing roll reaches the back roll, whereby heat is accumulated in the back roll and the back roll becomes the same state as in the fixing rolls. In such a case, it is necessary to control the coefficients of thermal shrinkage of the base film of the separate paper to 1% or less.

The present invention is described in more detail by the following Examples and Comparative Example.

EXAMPLE 1

As the base film for a label paper, a foamed white polyethylene terephthalate (PET) film (G1919, trade name, made by TOYOBO CO., LTD., thickness 50 μm) was used. The coefficients of thermal shrinkage ε of the film when the film was pre-heat-treated at 170° C. for 3 minutes and allowed to stand at 150° C. for 30 minutes were 0.48% in the lengthwise direction and 0.05% in the width direction. A matted layer was formed on the front surface side of the film. That is, the matted layer was formed by diluting the matting agent comprising a fine silica powder and a polyester resin, VM Mat M-6 (trade name, made by Dainichiseika Color & Chemicals Mfg. Co., Ltd.) to 20 wt. % with toluene and coating the diluted matting agent with a wire bar #10 at a dry thickness of 3 μm followed by drying at 100° C. for 3 minutes.

An antistatic agent layer was formed on the matted layer. That is, the antistatic agent layer was formed by diluting an antistatic agent (Electrostripper QN, trade name, made by Kao Corporation) with ethanol to form the 2 wt. % solution and coating the solution with a wire bar #5 at a dry thickness of about 0.1 μm followed by drying at 100° C. for 1 minute.

When the surface resistance at the label side of the label paper obtained was measured using Hiresta IP-HT260 (trade name, manufactured by Mitsusbishi Petrochemical Company, Ltd.), the surface resistivity was $2.35\times10^{12}$ Ω/cm$^2$.

On the other hand, as the base film for a separate paper, a foamed white PET film (F1919, trade name, made by TOYOBO CO., LTD., film thickness 75 μm) was used. The coefficients of thermal shrinkage ε of the film when the film was allowed to stand at 150° C. for 30 minutes were 1.35% in the lengthwise direction and 0.13% in the width direction.

Silicone resins (7223A and B, trade names, made by Shinetsu Silicone K. K.) were coated on the front surface of the film as a releasing layer. That is, the releasing layer was formed by diluting the silicone resins with hexane to form the 2 wt. % solution thereof and coating the solution with a wire bar #5 on the surface at a dry thickness of about 0.1 μm followed by drying at 100° C. for 10 seconds.

A matted layer was formed on the back surface side of the base film of the separate paper. That is, the matted layer was formed by diluting a matting agent, VMMat M-6 (trade name, made by Dainichiseika Color & Chemicals Mfg Co., Ltd.) with toluene to 20 wt. % and coating the diluted matting agent with a wire bar #10 at a dry thickness of 3 μm followed by drying at 100° C. for 3 minutes.

On the matted layer was formed an antistatic agent layer by diluting an antistatic agent (Electrostripper QN, trade name, made by Kao Corporation) with ethanol to form the 2 wt. % solution and coating the solution thereof with a wire bar #5 at a dry thickness of about 0.1 μm followed by drying at 100° C. for 1 minute.

When the surface resistivity of the back surface side of the separate paper thus obtained was measured using Hirestal IP-HT260 (trade name, manufactured by Mitsubishi Oil Co., Ltd.) it was $3.12\times10^{12}$ Ω/cm$^2$.

An adhesive was coated on the back surface side of the above label paper to forman adhesive layer and the label paper was adhered to the separate paper with the adhesive layer. That is, the adhesive layer was formed by diluting an acrylic adhesive with toluene to form the 15 wt. % solution and coating the solution obtained with an applicator (scale 6) at a dry thickness of 10 μm followed by drying at 100° C. for 3 minutes. The label paper was disposed on the separate paper such that the adhesive layer of the label paper was contacted with the silicone resin layer (releasing layer) of the separate paper, they were adhered to each other by a hand roller, and the assembly was cut into 210 mm in the width and 297 mm in the length to obtain an image-receiving paper as shown in FIG. 1.

Printing was applied to the label paper of the image-receiving paper with a test mode of 4530 LPS (trade name, manufactured by Fuji Xerox Co., Ltd. ) to carry out a running test.

Figure 2:
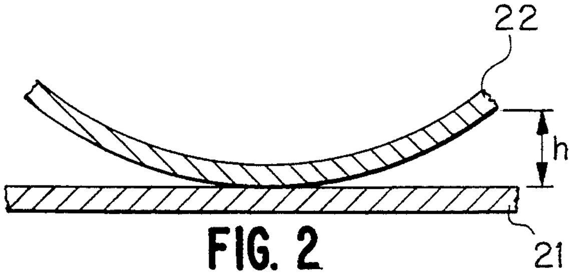
FIG. 2 is a schematic side view showing the state for measuring curling of an image-receiving paper before printing, and mainly for measuring curling at the front surface side of the image-receiving paper.
Figure 3:
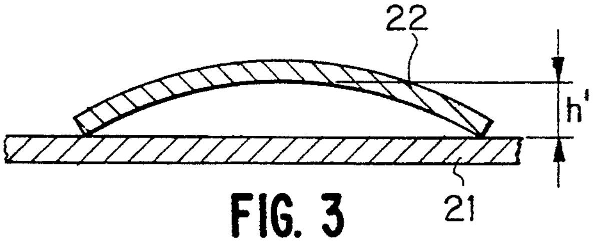
FIG. 3 is a schematic side view showing the state for measuring curling of an image-receiving paper before printing, and mainly for measuring curling at the back surface side of the image-receiving paper.

The curling amount before printing and the curling amount after printing were measured by the following method. Curling Before Printing:

The image-receiving paper 22 of 210 mm in the width and 297 mm in the length was placed on a horizontal plate 21 as shown in FIG. 2 and FIG. 3 with the label paper above and the highest value of h or h' showing the extent of curling was measured.

Figure 4:
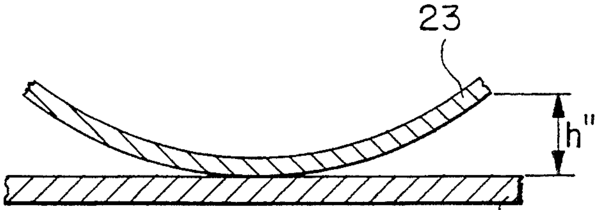
FIG. 4 is a schematic side view showing the state for measuring curling of an image-receiving paper after printing.

Curling After Printing:

Using the image-receiving paper 23 of 210 mm in the width and 297 mm in the length, after carrying out printing by a printing apparatus having a fixing roller of a heat fixing temperature of about 200° C., the image-receiving paper was placed on a horizontal plate 21 with the printed surface above as shown in FIG. 4, and the highest value of h" showing the extent of curling was measured.

The results obtained are shown in the Table below.

Figure 5:
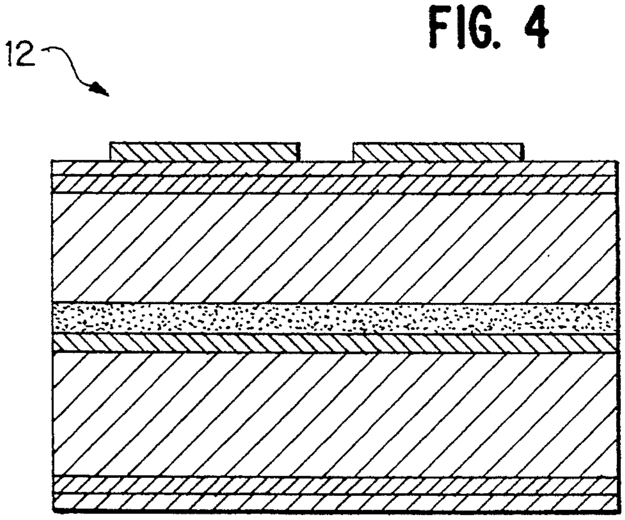
FIG. 5 is an enlarged cross sectional view showing images formed on the image-receiving paper after printing.

In addition, the enlarged schematic cross sectional view of the printed matter is shown in FIG. 5, in which 12 is images formed.

EXAMPLE 2

The base film; the coating methods and the drying conditions of the matted layer, the antistatic agent layer, an adhesive layer, and a releasing layer of the label paper and the separate paper; and the cut size of the image-receiving paper were the same as in Example 1, but the pre-heat-treatment condition for the foamed-white PET film was changed as follows.

That is, the coefficients of thermal shrinkage $\epsilon$ of the foamed white PET film used as the base film of the label paper after being allowed to stand at 150° C. for 30 minutes were 1.03% in the lengthwise direction and 0.12% in the width direction. The coefficients of thermal shrinkage $\epsilon$ of the foamed white PET film used as the base film of the separate paper after allowing to stand the film at 180° C. for 3 minutes and then allowing to stand at 150° C. for 30 minutes were reduced to 0.82% in the lengthwise direction and 0.15% in the width direction.

Using the image-receiving paper obtained, printing and the curling measurement were conducted in the same manner as in Example 1. The results obtained are shown in the Table below.

EXAMPLE 3

The film construction; the coating methods and the drying conditions of the matted layer, the antistatic agent layer, the adhesive layer, and the releasing layer of the label paper and the separate paper; and the cut size of the image-receiving paper were the same as in Example 1, but the preheat-treatment condition of the foamed white PET film was changed as follows.

That is, the coefficients of thermal shrinkage ratios $\epsilon$ of foamed white PET film used as the base film of the label paper after being allowed to stand at 150° C. for 30 minutes were 0.28% in the lengthwise direction and 0.11% in the width direction. On the other, the coefficients of thermal shrinkage $\epsilon$ of the foamed white PET film used as the base film of the separate paper after being allowed to stand at 150° C. for 30 minutes were 0.35% in the lengthwise direction and 0.26% in the width direction.

Using the image-receiving paper, printing and the curling measurement were conducted in the same manner as in Example 1. The results obtained are show in the Table below.

COMPARATIVE EXAMPLE 1

The film construction; the coating methods and the drying conditions of the matted layer, the antistatic agent layer, the adhesive layer, and the releasing layer of the label paper and the separate paper; and the cut size of the image-receiving paper were the same as in Example 1, but the pre-heat treatment for the foamed white PET film was changed as follows.

That is, the coefficients of thermal shrinkage ratios $\epsilon$ of the foamed white PET film used as the base film of the label paper after being allowed to stand at 150° C. for 30 minutes were 1.25% in the lengthwise direction and 0.25% in the width direction. Further, the coefficients of thermal shrinkage of the foamed white PET film used as the base film of the separate paper after being allowed to stand at 150° C. for 30 minutes were 2.26% in the lengthwise direction and 0.82% in the width direction. Using the image-receiving paper obtained, printing and the curling-measurement same were conducted in the same manner as in Example 1. The results obtained are shown in the Table below.

TABLE

| | Curled Amount After Printing | Curled Amount Before Printing |
|---|---|---|
| Example 1 | 10.5 | 11.0 |
| Example 2 | 9.8 | 10.3 |
| Example 3 | 8.7 | 9.2 |
| Comparative Example 1 | 12.0 | 20.3 |

As described above, when the electrophotographic image-receiving paper of the present invention is used for a highspeed printing apparatus using a fixing roll at high temperature, the image-receiving paper can stably run without forming the deformation and curling and also the curled amount occurring after printing is very small. In particular, the image-receiving paper is suitable as a tuck sheet by an electrostatic transfer with a toner.

While the invention has been described in detail and with reference to specific embodiments thereof, it will be apparent to one skilled in the art that various changes and modifications can be made therein without departing from the spirit and scope thereof.

What is claimed is:

1. An image-receiving paper comprising a label paper and a separate paper which is releasably adhered to the label paper, wherein said label paper comprises:

a synthetic resin film having a heat resistant temperature of at least 100° C. and having formed on the front surface thereof a matted layer and having formed on the back surface thereof an adhesive layer, wherein said matted layer has a surface resistivity of from $1\times10^6$ to $1\times10^{13}$ $\Omega/cm^2$ and comprises a toner adhering layer, and wherein said separate paper comprises: a synthetic resin film having a heat resistant temperature of at least 100° C., and having formed on the front surface thereof a releasing layer and having formed on the back surface thereof a matted layer and an antistatic agent layer, and the coefficients of thermal shrinkage $\epsilon$ of said label paper in the lengthwise direction and the width direction are all or less in the following test method:

Sample Form: 20 mm×100 mm

Load: None

Pre-treatment: 25° C. vacuum drying ($10^{-3}$ Torr or less), 24 hours

Heat Treatment Temperature: 150° C.±3° C.

Treatment Time: 30 minutes

Coefficient of Thermal Shrinkage $\epsilon$:

$$\epsilon=[(L_1-L_2)/L_1]\times 100$$

wherein $L^1$: Initial length $L_2$: Length when allowed to stand at room temperature for 30 minutes after the heat treatment.

2. An image-receiving paper as claimed in claim 1, wherein said separate paper has coefficients of thermal shrinkage in both the lengthwise direction and the width direction of 1% or less in the test method.

3. An image-receiving paper comprising a label paper and a separate paper which is releasably adhered to the label paper, wherein said label paper comprises:

a synthetic resin film having a heat resistant temperature of at least 100° C., and having formed on the front surface thereof a matted layer, and having formed on the back surface thereof an adhesive layer, wherein said matted layer has a surface resistivity of from $1\times10^6$ to $1\times10^{13}$ Ω/cm$^2$ and comprises a toner adhering layer, and wherein said separate paper comprises: a synthetic resin film having a heat resistant temperature of at least 100° C., and having formed on the front surface thereof a releasing layer, and having formed on the back surface thereof a matted layer and an antistatic agent layer, and coefficients of thermal shrinkage $\epsilon$ of the separate paper in both the lengthwise direction and the width direction are 1% or less in the following test method:

Test Form: 20 mm×100 mm

Load: None

Pre-treatment: 25° C. vacuum drying ($10^{-3}$ or less), 24 hours

Heat Treatment Temperature: 150° C.±3° C.

Treatment Time: 30 minutes

Coefficient of Thermal Shrinkage $\epsilon$:

$$\epsilon=[(L_1-L_2)]/L_1]\times 100$$

wherein $L_1$: Initial length $L_2$: Length when allowed to stand at room temperature for 30 minutes after the heat treatment.

4. An image-receiving paper as claimed in claim 3, wherein said label paper has coefficients of thermal shrinkage in both the lengthwise direction and the width direction of 1% or less in the test method.

* * * * *